(12) United States Patent
Kato et al.

(10) Patent No.: US 10,611,898 B2
(45) Date of Patent: Apr. 7, 2020

(54) GLASS FLAKES AND RESIN COMPOSITION

(71) Applicant: Nippon Sheet Glass Company, Limited, Tokyo (JP)

(72) Inventors: Shinichi Kato, Mie (JP); Nobuaki Tai, Mie (JP)

(73) Assignee: NIPPON SHEET GLASS COMPANY, LIMITED, Tokyo (JP)

(*) Notice: Subject to any disclaimer, the term of this patent is extended or adjusted under 35 U.S.C. 154(b) by 103 days.

(21) Appl. No.: 15/736,649

(22) PCT Filed: Jul. 11, 2016

(86) PCT No.: PCT/JP2016/003276
§ 371 (c)(1),
(2) Date: Dec. 14, 2017

(87) PCT Pub. No.: WO2017/022180
PCT Pub. Date: Feb. 9, 2017

(65) Prior Publication Data
US 2018/0155534 A1  Jun. 7, 2018

(30) Foreign Application Priority Data
Jul. 31, 2015 (JP) .................................. 2015-151417

(51) Int. Cl.
| | | |
|---|---|---|
| *C08K 9/08* | (2006.01) | |
| *C08K 9/06* | (2006.01) | |
| *C03C 3/091* | (2006.01) | |
| *C03C 17/32* | (2006.01) | |
| *C03C 17/30* | (2006.01) | |
| *C08K 7/00* | (2006.01) | |
| *C08L 23/12* | (2006.01) | |
| *C08K 3/40* | (2006.01) | |
| *C08L 67/02* | (2006.01) | |
| *C08K 7/14* | (2006.01) | |

(52) U.S. Cl.
CPC ............... *C08K 9/08* (2013.01); *C03C 3/091* (2013.01); *C03C 17/30* (2013.01); *C03C 17/326* (2013.01); *C08K 3/40* (2013.01); *C08K 7/00* (2013.01); *C08K 9/06* (2013.01); *C08L 23/12* (2013.01); *C08L 67/02* (2013.01); *C08K 7/14* (2013.01); *C08K 2201/003* (2013.01); *C08K 2201/005* (2013.01)

(58) Field of Classification Search
None
See application file for complete search history.

(56) References Cited

U.S. PATENT DOCUMENTS

| | | | | |
|---|---|---|---|---|
| 3,257,184 A | * | 6/1966 | Glaser .................. | C03B 37/005 65/85 |
| 3,915,929 A | * | 10/1975 | Kishikawa ............. | C08F 10/00 523/467 |
| 5,674,930 A | * | 10/1997 | Sugiura .................. | C08L 23/10 524/404 |
| 5,770,644 A | * | 6/1998 | Yamamoto ........... | C08K 5/34928 524/120 |
| 6,447,913 B1 | * | 9/2002 | Watanabe ............... | C08L 67/02 428/413 |
| 8,383,531 B2 | * | 2/2013 | Fujiwara ................ | A61K 8/25 501/70 |
| 2004/0138377 A1 | * | 7/2004 | Matsuoka ............... | B32B 27/08 525/55 |
| 2004/0220337 A1 | * | 11/2004 | Tsutsumi ............... | C08L 81/02 525/107 |
| 2004/0254270 A1 | * | 12/2004 | Harashina ............... | C08K 3/24 524/86 |
| 2006/0048679 A1 | * | 3/2006 | Fujiwara ............... | C03B 37/005 106/482 |
| 2008/0124559 A1 | * | 5/2008 | Fujiwara ................ | A61K 8/25 428/432 |
| 2009/0088515 A1 | * | 4/2009 | Yagyu ................... | C03B 37/005 524/494 |
| 2010/0183737 A1 | * | 7/2010 | Fujiwara ............... | A61K 8/25 424/613 |
| 2015/0337110 A1 | * | 11/2015 | Tai ....................... | C08K 5/5435 524/494 |
| 2018/0155534 A1 | * | 6/2018 | Kato ..................... | C08K 7/00 |

FOREIGN PATENT DOCUMENTS

| | | | | |
|---|---|---|---|---|
| EP | 2816019 A1 | * | 12/2014 | ........... C08K 5/5435 |
| EP | 2816019 A1 | | 12/2014 | |
| GB | 1095700 | | 12/1967 | |
| JP | 41017148 B | | 9/1966 | |
| JP | 45003541 B | | 2/1970 | |
| JP | S5921533 A | | 2/1984 | |
| JP | H02124732 A | | 5/1990 | |
| JP | H02503669 A | | 11/1990 | |
| JP | H06145519 A | | 5/1994 | |
| JP | H09510427 A | | 10/1997 | |
| JP | 2002129014 A | | 5/2002 | |
| JP | 2002212421 A | | 7/2002 | |
| JP | 2005170691 A | | 6/2005 | |
| JP | 2005256206 A | | 9/2005 | |

(Continued)

OTHER PUBLICATIONS

International Search Report issued for International Application No. PCT/JP2016/003276, dated Aug. 9, 2016, 5 pages including English translation.

Extended European Search Report issued for European Patent Application No. 16832470.5, dated Jan. 7, 2019, 5 pages.

*Primary Examiner* — Peter A Salamon
(74) *Attorney, Agent, or Firm* — Hamre, Schumann, Mueller & Larson, P.C.

(57) ABSTRACT

Glass flakes according to the present invention include: glass flake substrates; and a coating covering at least a portion of a surface of each of the glass flake substrates and composed of a binder. The binder includes an epoxy-modified polyolefin resin and a silane coupling agent. The proportion of the coating in the glass flakes is 0.05 to 3 mass %.

12 Claims, 2 Drawing Sheets

(56) References Cited

FOREIGN PATENT DOCUMENTS

| | | | |
|---|---|---|---|
| JP | 2005306926 | A | 11/2005 |
| JP | 2010150371 | A | 7/2010 |
| JP | 2012207075 | A | 10/2012 |
| WO | 8808412 | A1 | 11/1988 |
| WO | 9525074 | A1 | 9/1995 |
| WO | 2004076372 | A1 | 9/2004 |
| WO | 2006068255 | A1 | 6/2006 |
| WO | WO-2013121756 | A1 * | 8/2013 ........... C08K 5/5435 |

* cited by examiner

GLASS FLAKES AND RESIN COMPOSITION

TECHNICAL FIELD

The present invention relates to glass flakes and a resin composition including the glass flakes.

BACKGROUND ART

For resin molded articles, it is commonly known that glass fibers, carbon fibers, mica, glass beads, glass flakes or the like are added as a filler to a matrix resin to achieve reduction in warping and deformation and/or improvement in mechanical strength. For such a resin molded product, it has been considered preferable to surface-treat the filler with a silane coupling agent or the like to improve the adhesion between the matrix resin and the filler and thereby further enhance the mechanical strength of the resin molded article.

For example, in relation to resin molded articles whose matrix resin includes a polyolefin such as polypropylene, various techniques for improving the adhesion between the matrix resin and a filler have been proposed. For example, Patent Literature 1 proposes using glass fibers as a filler for polyolefin reinforcement and surface-treating the glass fibers with a specific treatment agent to improve the adhesion between the glass fibers and a polyolefin used as a matrix resin. A treatment agent proposed in Patent Literature 1 contains an organofunctional inorganic coupling agent and a polyolefin compatible film forming polymer such as a carboxylic acid-modified polyolefin. Patent Literature 2 discloses using glass fibers as a filler for polyolefin reinforcement and treating the surface of the glass fibers with a treatment agent (sizing agent) containing an acid-modified polyolefin resin and a silane coupling agent to improve the adhesion between the glass fibers and a polyolefin resin used as a matrix resin. Patent Literature 3 discloses using carbon fibers as a filler and employing a modified polyolefin grafted with maleic anhydride and (meth)acrylic acid ester as an agent for surface-treating the carbon fibers to improve the adhesion between the carbon fibers and polypropylene used as a matrix resin.

Patent Literature 4 describes a technique that improves the adhesion between a filler and a matrix resin by the use of a specific resin (a resin including polypropylene and an epoxy-modified polyolefin) as the matrix resin rather than by surface treatment of the filler.

CITATION LIST

Patent Literature

Patent Literature 1: JP 9(1997)-510427 A
Patent Literature 2: JP 2005-170691 A
Patent Literature 3: JP 2005-256206 A
Patent Literature 4: JP 2010-150371 A

SUMMARY OF INVENTION

Technical Problem

The above conventional treatment agents disclosed in Patent Literatures 1 to 3 for use in filler surface treatment can indeed improve the adhesion between a filler and a matrix resin to some extent. However, the resulting adhesion is still unsatisfactory, and a further improvement has been demanded.

The technique as proposed in Patent Literature 4, in which the adhesion between a filler and a matrix resin is improved by control of the components of the entire matrix resin, has a disadvantage in that the required amount of a component incorporated for adhesion improvement may be undesirably increased because of the failure of the component to efficiently exhibit the adhesion-improving function at the interface between the filler and the matrix resin. Such a matrix resin is a resin composition which is basically intended to serve as a matrix resin; therefore, the use of the matrix resin itself as an agent for surface treatment of a filler cannot be expected to provide high effect on adhesion improvement. Furthermore, for example, the matrix resin disclosed in Patent Literature 4 is one that provides adhesion improvement when used in combination with carbon fibers. The matrix resin therefore cannot be expected to provide high effect on adhesion improvement when used in combination with a glass filler which is made of a completely different material from carbon fibers.

It is therefore an object of the present invention to provide glass flakes capable, when used as a filler for reinforcing a resin molded article, of achieving strong adhesion to a matrix resin of the resin molded article and thereby imparting high mechanical strength to the resin molded article. Another object of the present invention is to provide a resin composition that contains such glass flakes and from which a resin molded article having high mechanical strength can be obtained.

Solution to Problem

The present invention provides glass flakes including:
glass flake substrates; and
a coating covering at least a portion of a surface of each of the glass flake substrates and composed of a binder, wherein
the binder includes an epoxy-modified polyolefin resin and a silane coupling agent, and
the proportion of the coating in the glass flakes is 0.05 to 3 mass %.

The present invention also provides a resin composition including the above glass flakes according to the present invention and a matrix resin.

Advantageous Effects of Invention

The glass flakes according to the present invention are capable, when used as a filler for reinforcing a resin molded article, of achieving strong adhesion to a matrix resin of the resin molded article and thereby imparting high mechanical strength to the resin molded article. The resin composition according to the present invention, which includes such glass flakes according to the present invention, can be used to obtain a resin molded article having high mechanical strength.

DESCRIPTION OF EMBODIMENTS

Hereinafter, an embodiment of the present invention will be described in detail.

Glass flakes according to the present embodiment include: glass flake substrates; and a coating covering at least a portion of a surface of each of the glass flake substrates and composed of a binder. This binder includes an epoxy-modified polyolefin resin and a silane coupling agent as essential components. The proportion of the coating in the glass flakes is 0.05 to 3 mass %. The glass flake substrates and coating will be described in more detail hereinafter.

The glass flake substrates used in the glass flakes according to the present embodiment can be produced, for example, by a so-called blow process as disclosed in JP 41(1966)-17148 B or JP 45(1970)-3541 B or by a so-called rotary process as disclosed in JP 59(1984)-21533 A or JP 2(1990)-503669 A.

Figure 1:
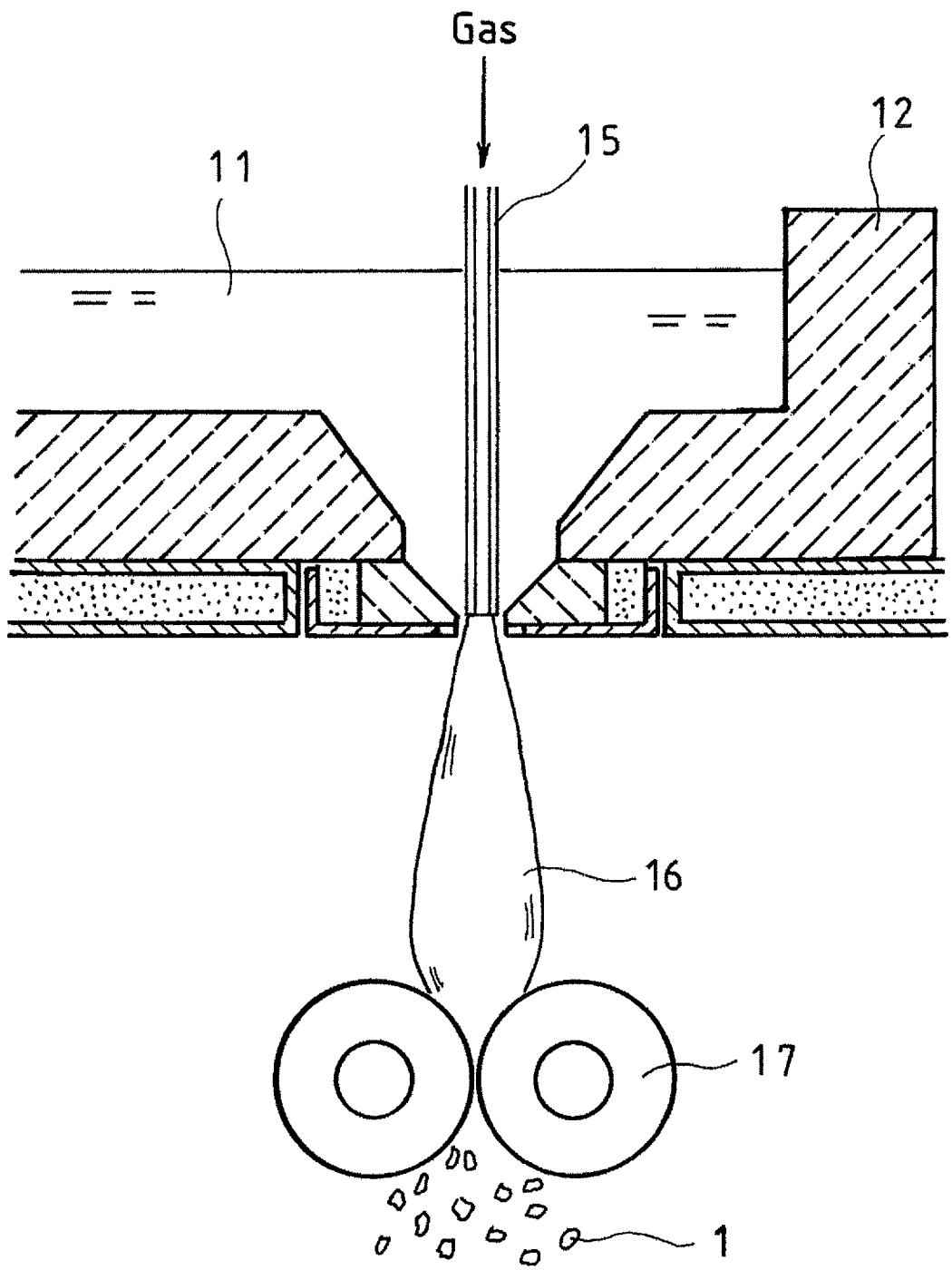
FIG. 1 is a schematic diagram illustrating an exemplary apparatus for producing glass flake substrates.

For the blow process, a glass production apparatus shown in FIG. 1 can be employed. This glass production apparatus includes a refractory tank furnace 12, a blowing nozzle 15, and pressure rolls 17. A glass raw material 11 is melted in the refractory tank furnace 12 (melting furnace) and is inflated into a balloon by a gas delivered through the blowing nozzle 15, so that hollow glass 16 is obtained. The hollow glass 16 is crushed by the pressure rolls 17 to obtain glass flake substrates 1. The thickness of the glass flake substrates 1 can be controlled by adjusting, for example, the speed of pulling the hollow glass 16 and the flow rate of the gas delivered through the blowing nozzle 15.

Figure 2:
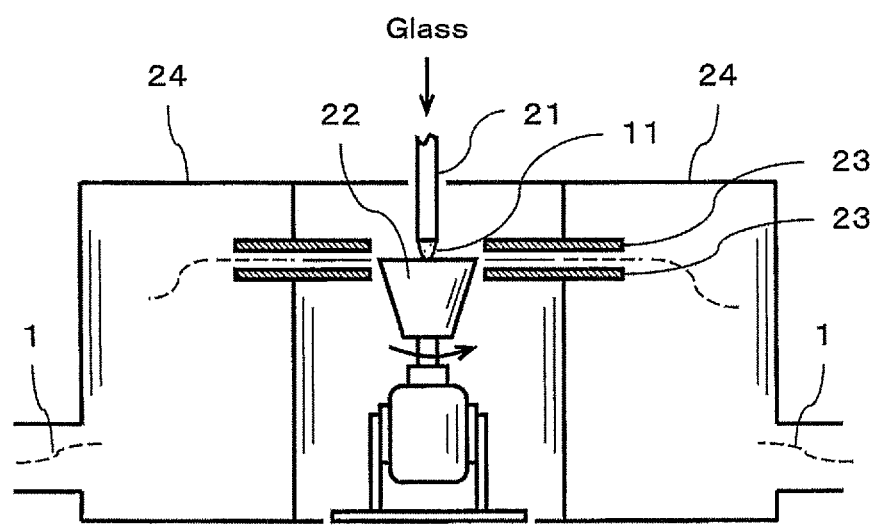
FIG. 2 is a schematic diagram illustrating another exemplary apparatus for producing glass flake substrates.

For the rotary process, a glass production apparatus shown in FIG. 2 can be employed. This glass production apparatus includes a rotary cup 22, a pair of annular plates 23, and an annular cyclone-type scavenging device 24. A molten glass raw material 11 is poured into the rotary cup 22 and is subjected to a centrifugal force, which causes the molten glass raw material 11 to radially flow out from the upper edge of the rotary cup 22. The molten glass raw material 11 is then drawn by an air stream and introduced into the annular cyclone-type scavenging device 24 through the gap between the annular plates 23. While passing through the annular plates 23, the glass cools and solidifies into a thin film, which is then crushed into fine pieces to give glass flake substrates 1. The thickness of the glass flake substrates 1 can be controlled by adjusting, for example, the distance between the annular plates 23 and the velocity of the air stream.

Commonly known glass compositions can be employed as the composition of the glass flake substrates. Specifically, glass such as E-glass which has a low content of alkali metal oxides can be suitably used. A typical composition of E-glass is shown below. In the compositions shown below, the unit of the values is mass %.

$SiO_2$: 52 to 56,
$Al_2O_3$: 12 to 16,
CaO: 16 to 25,
MgO: 0 to 6,
$Na_2O+K_2O$: 0 to 2 (preferably 0 to 0.8),
$B_2O_3$: 5 to 13, and
$F_2$: 0 to 0.5.

Another usable glass having a low content of alkali metal oxides is a glass composition containing, in mass %, $59 \leq SiO_2 \leq 65$, $8 \leq Al_2O_3 \leq 15$, $47 \leq (SiO_2 - Al_2O_3) \leq 57$, $1 \leq MgO \leq 5$, $20 \leq CaO \leq 30$, $0 < (Li_2O + Na_2O + K_2O) < 2$, and $0 \leq TiO_2 \leq 5$, the glass composition being substantially free of $B_2O_3$, F, ZnO, BaO, SrO, and $ZrO_2$. This glass composition is disclosed by the present applicant in WO 2006/068255 A1.

Being "substantially free" of a component means that the component is not intentionally incorporated although the component may be inevitably introduced from, for example, industrial materials. Specifically, the term "substantially free" is used to mean that the respective contents of $B_2O_3$, F, ZnO, BaO, SrO, and $ZrO_2$ are less than 0.1 mass % (preferably less than 0.05 mass %, more preferably less than 0.03 mass %).

The average thickness and average particle diameter of the glass flake substrates are not particularly limited. The thinner the glass flake substrates are, the larger the aspect ratio (a value calculated by dividing the average particle diameter by the average thickness) of the glass flake substrates is, and thus the higher the blocking effect against penetration of water or gas into a resin composition filled with the glass flakes is, but the lower the workability is. The average thickness and the average particle diameter can be selected in view of the balance among the blocking effect, the reinforcing effect on resin molded articles, the workability, the degree of technical difficulty, and the product cost effectiveness. Specifically, the use of glass flake substrates with an average thickness of 7 μm or less and an aspect ratio of 50 or more for production of the glass flakes is preferred to ensure a good balance among the blocking effect, the reinforcing effect on resin molded articles, the workability, and the product cost effectiveness. In view of the degree of technical difficulty and the product cost effectiveness, the average thickness is preferably 0.1 μm or more. To more effectively achieve the reinforcing effect on resin molded articles, the average particle diameter is preferably 10 to 2000 μm. The average aspect ratio is preferably 2000 or less in view of the dispersibility in resins. The average thickness of the glass flake substrates, as described herein, refers to a value determined by extracting 100 or more of the glass flake substrates, measuring the thickness of the 100 or more glass flake substrates with a scanning electron microscope (SEM), and dividing the sum of the measured thickness values by the number of the glass flake substrates whose thickness has been measured. The average particle diameter as described herein refers to a particle diameter (D50) at a cumulative mass percentage of 50% in a particle size distribution measured by a laser diffraction-scattering method.

As previously mentioned, the binder for forming the coating contains an epoxy-modified polyolefin resin and a silane coupling agent as essential components.

The epoxy-modified polyolefin resin is preferably a polyolefin-glycidyl methacrylate copolymer, a polyolefin-allyl glycidyl ether copolymer, and/or a copolymer composed of a polyolefin on which glycidyl methacrylate or allyl glycidyl ether has been grafted under action of an organic peroxide. An ethylene-glycidyl methacrylate copolymer (in particular, an ethylene-glycidyl methacrylate graft copolymer) including ethylene and glycidyl methacrylate as essential components is suitably used as the epoxy-modified polyolefin resin. However, the epoxy-modified polyolefin resin is not limited to the above copolymers, and other examples of resins that can be used include an ethylene-vinyl acetate-glycidyl methacrylate copolymer, an ethylene-methyl acrylate-glycidyl methacrylate copolymer, an ethylene-ethyl acrylate-glycidyl methacrylate copolymer, an ethylene-butyl acrylate-glycidyl methacrylate copolymer, an ethylene-acrylic acid-acrylic acid ester-glycidyl methacrylate copolymer, an ethylene-methacrylic acid ester-glycidyl methacrylate copolymer, an ethylene-methacrylic acid-methacrylic acid ester copolymer-glycidyl methacrylate copolymer, an ethylene-polypropylene copolymer-glycidyl methacrylate graft copolymer, an ethylene-vinyl acetate copolymer-glycidyl methacrylate graft copolymer, a polypropylene-glycidyl methacrylate copolymer, and a polypropylene-glycidyl methacrylate graft copolymer.

Examples of the silane coupling agent include γ-aminopropyltriethoxysilane, γ-aminopropyltrimethoxysilane, γ-ureidopropyltriethoxysilane, γ-glycidoxypropyltrimethoxysilane, vinyltriethoxysilane, and γ-methacryloxypropyltrimethoxysilane. Among these, γ-aminopropyltriethoxysilane, γ-aminopropyltrimethoxysilane, and γ-ureidopropyltriethoxysilane are suitably used. A titanium coupling agent, an aluminum coupling agent, or a zirconia coupling agent can be used in addition to the silane coupling agent.

In the binder, the content ratio between the silane coupling agent and the epoxy-modified polyolefin resin (silane coupling agent:epoxy-modified polyolefin), as expressed by a mass ratio between solids exclusive of water and solvents, is, for example, 1:99 to 90:10, preferably 10:90 to 80:20, and more preferably 25:75 to 60:40.

The binder may, if necessary, include another component in addition to the epoxy-modified polyolefin resin and the silane coupling agent. The binder preferably further includes a crosslinking agent. When the coating of the glass flakes according to the present embodiment is formed from the binder further including a crosslinking agent, the reinforcing effect of the glass flakes according to the present embodiment on resin molded articles can be enhanced. At least one selected from the group consisting of a bismaleimide compound and a peroxide is suitably used as the crosslinking agent.

As the bismaleimide compound there is suitably used 4,4'-methylene diphenyl bismaleimide. Other examples of bismaleimide compounds that can be used include m-phenylene bismaleimide, 4-methyl-m-phenylene bismaleimide, 4,4'-ethylene diphenyl bismaleimide, and 4,4'-vinylene diphenyl bismaleimide.

The peroxide is preferably one that maintains a sufficient activity even after the glass flake substrates are surface-treated with a solution containing the binder (binder solution) and then dried. Examples of such a peroxide include tert-butyl hydroperoxide, 2,5-dimethyl-2,5-di(tert-butylperoxy)hexane, dicumyl peroxide, tert-butyl cumyl peroxide, 2,5-dimethyl-2,5-di(tert-butylperoxy)hexane-3, and α,α'-bis(tert-butylperoxy)diisopropylbenzene. Among these, tert-butyl hydroperoxide and 2,5-dimethyl-2,5-di(tert-butylperoxy)hexane are suitably used.

The binder may, if necessary, further include another component such as a urethane resin, a surfactant, and/or an anti-foaming agent in addition to the components described above.

The method for producing the binder is not particularly limited. For example, a dispersion prepared by uniformly dispersing a resin in water with the aid of an emulsifier or the like is mixed with a hydrolyzed silane coupling agent, and the mixture is used as the binder solution. Alternatively, the binder solution can be produced by adding the epoxy-modified polyolefin resin, the silane coupling agent etc. to an organic solvent at ordinary temperature and atmospheric pressure and then by stirring the mixture until the mixture becomes homogeneous.

In the present embodiment, for example, the binder solution is added to the glass flake substrates, which are stirred and then dried to form a coating covering at least a portion of the surface of each of the glass flake substrates. The method for accomplishing the addition of the binder solution, the stirring, and the drying is not limited to specific ones. Examples of the method will now be described.

For example, the glass flake substrates are fluidized in a mixer such as a rotary disk mixer or Henschel mixer having a mixing vessel equipped with a rotating blade, a predetermined amount of the binder is added to the flowing glass flake substrates by a means such as a spray, and the glass flake substrates and the binder are mixed and stirred. Next, the glass flake substrates are dried under stirring in the mixer, or the glass flake substrates are taken out of the mixer and dried. This method can produce glass flakes provided with a coating.

In another example, the glass flakes can be produced by tumbling granulation as described in JP 2(1990)-124732 A. That is, the glass flakes can be produced by placing the glass flake substrates in a horizontal vibrating granulator equipped with a stirring blade, spraying the binder solution onto the glass flake substrates, and performing granulation.

The glass flakes can be produced also by using known methods other than the above examples, such as methods generally called stirring granulation, fluidized bed granulation, injection granulation, and rotary granulation.

The drying step is accomplished, for example, by heating the glass flake substrates to a temperature equal to or higher than the boiling point of the solvent used in the binder solution and drying the glass flake substrates until the solvent fully evaporates.

The proportion of the coating in the glass flakes can be controlled by adjusting the concentration of the binder in the binder solution to be added or sprayed. That is, the glass flakes having a predetermined proportion of the coating composed of the binder can be produced by adding or spraying a predetermined amount of the binder solution onto a predetermined amount of the glass flake substrates so that a predetermined amount of the binder is deposited on the glass flake substrates.

The proportion of the coating in the glass flakes is 0.05 to 3 mass %, desirably 0.2 to 2 mass %, and more desirably 0.3 to 1 mass %. If the proportion of the coating is less than 0.05 mass %, covering of the glass flake substrates by the binder may be insufficient, and the insufficient covering can cause a decrease in the strength of the resulting resin molded article. If the proportion of the coating is more than 3 mass %, extrusion molding may involve generation of a gas which causes problems such as fouling of the mold or discoloration of the resulting resin molded article. Additionally, if the proportion of the coating is more than 3 mass %, the binding force between the glass flakes themselves may be so increased that insufficient kneading during resin molding can cause the glass flakes to remain as aggregates in the resulting resin molded article, thus leading to a decrease in the strength of the resin molded article. Further, if the proportion of the coating is more than 3 mass %, the components of the excess coating may impair the adhesion between the glass and the matrix resin and thus cause a failure to achieve good properties of the resulting molded article.

Next, a resin composition according to the present embodiment will be described.

The resin composition according to the present embodiment includes the above-described glass flakes according to the present embodiment and a matrix resin.

The matrix resin is not particularly limited, and examples thereof include: polyolefins such as polybutylene, polypropylene, and polyethylene; polyesters such as thermoplastic polyester resins typified by polybutylene terephthalate; polycarbonate; polyvinyl chloride; polystyrene; polyamide; copolymers thereof polyphenylene sulfide; polyphenylene ether; polyetheretherketone; and liquid-crystal polymers (including types I, II, and III). The glass flakes according to the present embodiment can exhibit high reinforcing effect on a resin molded article especially when a polyolefin or a thermoplastic polyester resin is used as the matrix resin. In particular, when the polyolefin used is polypropylene or the thermoplastic polyester resin used is polybutylene terephthalate, the reinforcing effect can be further enhanced.

The content of the glass flakes in the resin composition is preferably 5 to 70 mass %. Controlling the content to 5 mass % or more allows the glass flakes to fully exhibit their function as a reinforcing material. Controlling the content to 70 mass % or less allows the glass flakes to be uniformly dispersed in the resin composition. The content of the glass flakes is more preferably controlled to 30 mass % or more and 60 mass % or less to reduce the molding shrinkage.

The resin composition may, depending on its intended use, contain a reinforcing material other than the glass flakes, such as glass fibers. For example, when the resin composition is used in a part of an electric or electronic device, the resin composition may contain glass fibers in an amount comparable to that of the glass flakes since such a part needs to have very high strength.

A resin molded article produced using the resin composition according to the present embodiment can have high tensile strength and high bending strength by virtue of the reinforcing effect of the glass flakes. Additionally, the molding shrinkage of the resin composition according to the present embodiment is low, and a resin molded article having high dimensional stability can thus be obtained using the resin composition. Further, since the glass flakes contained in the resin composition according to the present embodiment have a smaller average thickness than glass flakes contained in conventional resin compositions, a resin molded article having a smooth surface with small surface roughness can be obtained using the resin composition according to the present embodiment.

EXAMPLES

Hereinafter, the embodiment of the present invention will be described in more detail with Examples and Comparative Examples.

Example 1

(Glass Flakes)

First, E-glass having a composition shown in Table 1 was used to produce glass flake substrates by a blow process as described with reference to FIG. 1. Specifically, the E-glass was placed and melted in a melting furnace heated to 1200° C. or higher. Air was blown from a nozzle into the molten glass to form thin glass, and this thin glass was continuously pulled out by rollers. The amount of the blown air and the rotation speed of the rollers were controlled to give glass with an average thickness of 0.7 µm. Afterwards, the glass was crushed, and pieces of the crushed glass were classified to give glass flake substrates having an average particle diameter of 160 µm. Glass flake substrates with a uniform size can be obtained by crushing into glass flake substrates, followed by classification of the glass flake substrates by means of a sieve having an appropriate opening size.

TABLE 1

| | (Unit: mass %) E-glass |
|---|---|
| $SiO_2$ | 54.7 |
| $Al_2O_3$ | 14.0 |
| CaO | 23.4 |
| MgO | 0.3 |
| $Na_2O$ | 0.4 |
| $K_2O$ | 0.2 |
| $B_2O_3$ | 5.8 |
| Other components | 1.2 |

Next, 5 kg of the glass flake substrates were placed in a Henschel mixer. A binder solution was added using a spray, and the substrates and binder solution were mixed and stirred for 15 minutes during which the spraying was continued. The binder solution contained a binder (solid) including an ethylene-glycidyl methacrylate graft copolymer (glycidyl methacrylate content: about 15 mass %) as the epoxy-modified polyolefin resin and γ-aminopropyltriethoxysilane as the silane coupling agent. In the binder of the binder solution, the content of the epoxy-modified polyolefin resin was 50 mass %, and the content of the silane coupling agent was 50 mass %. The solvent used in the binder solution was water. After the stirring, glass flakes (undried) were taken out of the mixer and dried by a dryer at 125° C. for 8 hours. Glass flakes of Example 1 were thus obtained.

The proportion of the deposited binder in the obtained glass flakes was examined by loss on ignition. Specifically, a proper amount of the glass flakes were dried at 110° C. and then heated in an atmosphere at 625° C. to remove the binder from the surface of the glass flakes. The proportion of the deposited binder in the glass flakes was calculated from the difference between the mass of the glass flakes before the heating and the mass of the glass flakes after the heating. The result is shown in Table 2. In Table 2, the ethylene-glycidyl methacrylate graft copolymer is denoted as "PE-GMA".

(Resin Molded Article)

The glass flakes of Example 1 and polypropylene (NOVATEC BC06C, manufactured by Japan Polypropylene Corporation) were kneaded by an extrusion molding machine (KZW15-30MG, manufactured by Technovel Corporation; molding temperature=about 210 to 220° C.) to obtain a resin composition including polypropylene as a matrix resin and glass flakes as a reinforcing filler. This resin composition was molded by an injection molding machine (HM7, manufactured by Nissei Plastic Industrial Co., Ltd.) to obtain a resin molded article. The content of the glass flakes in the obtained resin molded article was 30 mass %.

The properties of the resin molded article were examined. The maximum tensile strength, tensile modulus, and tensile strain were measured according to JIS K 7113. The maximum flexural strength, flexural modulus, and flexural strain were measured according to JIS K 7171. The Izod impact strength was measured according to JIS K 7111-1. The measurement results are shown in Table 2.

Examples 2 and 3

Glass flakes of Examples 2 and 3 were produced in the same manner as in Example 1, except that the ratio between the epoxy-modified polyolefin resin and the silane coupling agent in the binder contained in the binder solution was changed as shown in Table 2. As in Example 1, an ethylene-glycidyl methacrylate graft copolymer (glycidyl methacrylate content: about 15 mass %) was used as the epoxy-modified polyolefin resin, and γ-aminopropyltriethoxysilane was used as the silane coupling agent. The proportion of the coating in the obtained glass flakes was measured in the same manner as in Example 1. Resin molded articles were also produced and their various properties were measured in the same manner as in Example 1. The results are shown in Table 2.

Examples 4 to 9

Glass flakes of Examples 4 to 9 differing in the proportion of the coating from the glass flakes of Example 1 were produced by adjusting the concentration of the binder in the binder solution. The ratio between the epoxy-modified polyolefin resin and the silane coupling agent in the binder was the same as that in Example 1, and the procedures for producing the glass flakes were also the same as those in Example 1. As in Example 1, an ethylene-glycidyl methacrylate graft copolymer (glycidyl methacrylate content: about 15 mass %) was used as the epoxy-modified polyolefin resin, and γ-aminopropyltriethoxysilane was used as the silane coupling agent. The proportion of the coating in the obtained glass flakes was measured in the same manner as in Example 1. Resin molded articles were also produced and their various properties were measured in the same manner as in Example 1. The results are shown in Table 2.

Examples 10 to 13

Glass flakes of Examples 10 to 13 were produced in the same manner as in Example 1, except for further adding a crosslinking agent to the binder. A bismaleimide compound used as the crosslinking agent in Examples 10 to 12 was 4,4'-methylene diphenyl bismaleimide, and a peroxide used as the crosslinking agent in Example 13 was tert-butyl hydroperoxide. For the glass flakes of Examples 10 to 13, the ratio among the epoxy-modified polyolefin resin, silane coupling agent, and crosslinking agent in the binder was as shown in Table 2. As in Example 1, an ethylene-glycidyl methacrylate graft copolymer (glycidyl methacrylate content: about 15 mass %) was used as the epoxy-modified polyolefin resin, and γ-aminopropyltriethoxysilane was used as the silane coupling agent. The proportion of the coating in the obtained glass flakes was measured in the same manner as in Example 1. Resin molded articles were also produced and their various properties were measured in the same manner as in Example 1. The results are shown in Table 2.

Comparative Example 1

Glass flakes of Comparative Example 1 differing in the proportion of the coating from the glass flakes of Example 1 were produced by adjusting the concentration of the binder in the binder solution. The ratio between the epoxy-modified polyolefin resin and the silane coupling agent in the binder was the same as that in Example 1, and the procedures for producing the glass flakes were also the same as those in Example 1. As in Example 1, an ethylene-glycidyl methacrylate graft copolymer (glycidyl methacrylate content: about 15 mass %) was used as the epoxy-modified polyolefin resin, and γ-aminopropyltriethoxysilane was used as the silane coupling agent. The proportion of the coating in the obtained glass flakes was measured in the same manner as in Example 1. A resin molded article was also produced and its various properties were measured in the same manner as in Example 1. The results are shown in Table 2.

Comparative Examples 2 to 4

Glass flakes of Comparative Examples 2 to 4 were produced in the same manner as in Example 1, except for replacing the epoxy-modified polyolefin resin (ethylene-glycidyl methacrylate graft copolymer) by a urethane resin (Impranil DLC-F, manufactured by Sumitomo Bayer Urethane Co., Ltd.), an epoxy resin (Epolsion EA10, manufactured by Henkel Japan Ltd.), or an acid-modified polypropylene resin (Hitec P-9018, manufactured by Toho Chemical Industry Co., Ltd. and referred to as "modified PP" in the following description and Table 2). The proportion of the coating in the obtained glass flakes was measured in the same manner as in Example 1. Resin molded articles were also produced and their various properties were measured in the same manner as in Example 1. The results are shown in Table 2.

Comparative Example 5

Glass flakes of Comparative Example 5 were produced in the same manner as in Example 1, except that the binder contained no silane coupling agent (γ-aminopropyltriethoxysilane) and consisted of the epoxy-modified polyolefin resin. The proportion of the coating in the obtained glass flakes was measured in the same manner as in Example 1. A resin molded article was also produced and its various properties were measured in the same manner as in Example 1. The results are shown in Table 2.

As seen from Table 2, the mechanical strength of the resin molded article was higher in Examples 1 to 13 than in the case where the proportion of the coating in the glass flakes was more than 3 mass % (Comparative Example 1), in the case of employing a urethane resin or epoxy resin which is commonly used as a binder (Comparative Examples 2 and 3), in the case of employing a modified PP which has been conventionally proposed as a resin component for a binder (Comparative Example 4), and in the case of employing a binder containing no silane coupling agent and consisting only of an epoxy-modified polyolefin resin (Comparative Example 5). The glass flakes of Examples 10 to 12, which employed a binder containing a bismaleimide compound as a crosslinking agent, exhibited a higher mechanical strength than the glass flakes of Example 1 where the conditions were the same as those in Examples 10 to 12 except for the addition of the crosslinking agent. The content of the glass flakes in the resin molded article was the same (30 mass %) for all of Examples and Comparative Examples. This leads to the conclusion that the epoxy-modified polyolefin resin correlates with the strength of a resin including polypropylene.

TABLE 2

| | | Examples | | | | | | | | |
|---|---|---|---|---|---|---|---|---|---|---|
| | | 1 | 2 | 3 | 4 | 5 | 6 | 7 | 8 | 9 |
| Proportion of coating (mass %) | | 0.5 | 0.5 | 0.5 | 0.2 | 0.3 | 0.8 | 1.0 | 1.5 | 2.0 |
| Binder | Type of resin | PE-GMA | PE-GMA | PE-GMA | PE-GMA | PE-GMA | PE-GMA | PE-GMA | PE-GMA | PE-GMA |
| | Coupling agent content (mass %) | 50 | 20 | 80 | 50 | 50 | 50 | 50 | 50 | 50 |
| | Resin content (mass %) | 50 | 80 | 20 | 50 | 50 | 50 | 50 | 50 | 50 |
| | Crosslinking agent content (mass %) | 0 | 0 | 0 | 0 | 0 | 0 | 0 | 0 | 0 |
| Matrix resin | | Polypropylene | | | | | | | | |
| Properties of molded article | Maximum tensile strength (MPa) | 43.3 | 43.8 | 42.9 | 40.4 | 41.4 | 43.5 | 42.3 | 41.8 | 40.5 |
| | Tensile modulus (MPa) | 1898 | 1910 | 1813 | 1578 | 1701 | 1901 | 1750 | 1712 | 1641 |
| | Tensile strain (%) | 2.8 | 3.2 | 3.4 | 2.7 | 2.8 | 2.9 | 2.9 | 2.8 | 2.7 |
| | Maximum flexural strength (MPa) | 90.1 | 92.1 | 86.6 | 85.3 | 87.5 | 89.9 | 86.0 | 85.2 | 84.7 |
| | Flexural modulus (MPa) | 4469 | 4504 | 4428 | 4454 | 4511 | 4492 | 4475 | 4413 | 4253 |
| | Flexural strain (%) | 3.1 | 3.1 | 3.2 | 2.7 | 2.8 | 3.0 | 3.1 | 2.8 | 2.7 |
| | Izod impact strength UN[*1] (kJ/m$^2$) | 21.6 | 21.9 | 20.9 | 18.8 | 19.5 | 20.5 | 19.9 | 17.8 | 17.5 |
| | Izod impact strength N[*2] (kJ/m$^2$) | 1.9 | 2.0 | 1.8 | 1.8 | 1.8 | 1.8 | 1.8 | 1.7 | 1.6 |

| | | Examples | | | | Comparative Examples | | | | |
|---|---|---|---|---|---|---|---|---|---|---|
| | | 10 | 11 | 12 | 13 | 1 | 2 | 3 | 4 | 5 |
| Proportion of coating (mass %) | | 0.5 | 0.5 | 0.5 | 0.5 | 4.0 | 0.5 | 0.5 | 0.5 | 0.5 |
| Binder | Type of resin | PE-GMA | PE-GMA | PE-GMA | PE-GMA | PE-GMA | Urethane | Epoxy | Modified PP | PE-GMA |
| | Coupling agent content (mass %) | 37.5 | 31.25 | 25 | 45 | 50 | 50 | 50 | 50 | 0 |
| | Resin content (mass %) | 37.5 | 31.25 | 25 | 45 | 50 | 50 | 50 | 50 | 100 |
| | Crosslinking agent content (mass %) | 25 | 37.5 | 50 | 10 | 0 | 0 | 0 | 0 | 0 |
| Matrix resin | | Polypropylene | | | | Polypropylene | | | | |
| Properties of molded article | Maximum tensile strength (MPa) | 44.7 | 45.2 | 45.9 | 43.6 | 34.1 | 33.8 | 34.1 | 39.8 | 40.3 |
| | Tensile modulus (MPa) | 1949 | 1968 | 1971 | 1901 | 1110 | 1211 | 1335 | 1545 | 1551 |
| | Tensile strain (%) | 3.0 | 3.3 | 3.5 | 3.0 | 2.1 | 2.1 | 1.4 | 2.7 | 2.5 |
| | Maximum flexural strength (MPa) | 91.7 | 93.7 | 94 | 88.8 | 68.4 | 66.4 | 65.1 | 80.4 | 84.5 |

TABLE 2-continued

| | | | | | | | | | |
|---|---|---|---|---|---|---|---|---|---|
| Flexural modulus (MPa) | 4775 | 4740 | 4753 | 4351 | 4213 | 3001 | 2984 | 4113 | 3977 |
| Flexural strain (%) | 3.2 | 3.4 | 3.4 | 3.2 | 2.4 | 2.3 | 1.9 | 2.6 | 2.7 |
| Izod impact strength UN[1] (kJ/m$^2$) | 24.3 | 25.9 | 28.2 | 22.4 | 15.9 | 10.6 | 9.5 | 14.7 | 17.5 |
| Izod impact strength N[2] (kJ/m$^2$) | 2.4 | 2.5 | 2.9 | 2.1 | 1.3 | 1.1 | 1.3 | 1.6 | 1.1 |

Notes
[1]Unnotched
[2]Notched

Example 14

(Glass Flakes)

Glass flakes of Example 14 were produced in the same manner as in Example 1, except for changing the proportion of the coating.

(Resin Molded Article)

The glass flakes of Example 14 and polybutylene terephthalate (DURANEX 2000, manufactured by WinTech Polymer Ltd.) were kneaded by an extrusion molding machine (KZW15-30MG, manufactured by Technovel Corporation; molding temperature=about 230 to 240° C.) to obtain a resin composition including polybutylene terephthalate as a matrix resin and glass flakes as a reinforcing filler. This resin composition was molded by an injection molding machine (HM7, manufactured by Nissei Plastic Industrial Co., Ltd.) to obtain a resin molded article. The content of the glass flakes in the obtained resin molded article was 30 mass %. The properties (the maximum tensile strength, maximum flexural strength, and Izod impact strength) of the resin molded article were examined in the same manner as in Example 1. The results are shown in Table 3. The term "moist heating" in Table 3 is used to mean that the strength of the specimen was measured after it was placed at 85° C. and 85 RH % for the indicated days. The ethylene-glycidyl methacrylate graft copolymer is denoted as "PE-GMA" also in Table 3.

Comparative Examples 6 and 7

Glass flakes of Comparative Examples 6 and 7 were produced in the same manner as in Example 14, except for replacing the epoxy-modified polyolefin resin by a urethane resin (Impranil DLC-F, manufactured by Sumitomo Bayer Urethane Co., Ltd.) or an epoxy resin (Epolsion EA10, manufactured by Henkel Japan Ltd.). Resin molded articles were also produced and their various properties were measured in the same manner as in Example 14. The results are shown in Table 3.

As seen from Table 3, the mechanical strength of the resin molded article was higher in Example 14 than in the case of employing a urethane resin or epoxy resin which is commonly used as a binder (Comparative Examples 6 and 7). The content of the glass flakes in the resin molded article was the same (30 mass %) for all of Example and Comparative Examples. This leads to the conclusion that the epoxy-modified polyolefin resin correlates with the strength of a resin containing polybutylene terephthalate.

TABLE 3

| | | | Example 14 | Comparative Example 6 | Comparative Example 7 |
|---|---|---|---|---|---|
| | Proportion of coating | (mass %) | 0.6 | 0.6 | 0.6 |
| Binder | Type of resin | | PE-GMA | Urethane | Epoxy |
| | Coupling agent content | (mass %) | 50 | 50 | 50 |
| | Resin content | (mass %) | 50 | 50 | 50 |
| | Matrix resin | | Polybutylene terephthalate | Polybutylene terephthalate | Polybutylene terephthalate |
| Properties of molded article | Maximum tensile strength-initial | (MPa) | 86.9 | 74.5 | 78.1 |
| | Maximum tensile strength-moist heating (two days) | (MPa) | 82.5 | 62.3 | 72.2 |
| | Maximum tensile strength-moist heating (seven days) | (MPa) | 79.9 | 59.3 | 70.1 |
| | Maximum flexural strength-initial | (MPa) | 151.7 | 136.5 | 142.0 |
| | Maximum flexural strength-moist heating (two days) | (MPa) | 140.9 | 111.3 | 124.0 |
| | Maximum flexural strength-moist heating (seven days) | (MPa) | 136.2 | 101.0 | 125.0 |
| | Izod impact strength UN[1] | (kJ/m$^2$) | 5.8 | 3.4 | 3.3 |
| | Izod impact strength N[2] | (kJ/m$^2$) | 47.1 | 34.9 | 37.2 |

Notes
[1]Unnotched
[2]Notched

INDUSTRIAL APPLICABILITY

The glass flakes according to the present invention are capable of effectively reinforcing resin molded articles as well as being effective in reducing warping and shrinkability of the resin molded articles, and are therefore applicable to various uses. For example, a resin composition including the glass flakes according to the present invention and polypropylene or polybutylene terephthalate can be suitably used, for example, in the field of automobiles and in the field of electronic parts.

The invention claimed is:

1. A glass flake composition comprising:
   glass flake substrates; and
   a coating covering at least a portion of a surface of each of the glass flake substrates and composed of a binder, wherein
   the binder comprises an epoxy-modified polyolefin resin and a silane coupling agent, and
   the proportion of the coating in the glass flake composition is 0.05 to 3 mass %, and
   in the binder, a content ratio between the silane coupling agent and the epoxy-modified polyolefin resin (silane coupling agent: epoxy-modified polyolefin) as expressed by a mass ratio between solids is 10:90 to 80:20.

2. The glass flake composition according to claim 1, wherein the binder further comprises a crosslinking agent.

3. The glass flake composition according to claim 2, wherein the crosslinking agent is at least one selected from the group consisting of a bismaleimide compound and a peroxide.

4. The glass flake composition according to claim 1, wherein the epoxy-modified polyolefin resin is a copolymer comprising ethylene and glycidyl methacrylate as essential components.

5. The glass flake composition according to claim 4, wherein the epoxy-modified polyolefin resin is an ethylene-glycidyl methacrylate graft copolymer.

6. The glass flake composition according to claim 1, wherein the glass flake substrates have an average thickness of 0.1 to 7 μm and an average particle diameter of 10 to 2000 μm.

7. A resin composition comprising the glass flake composition according to claim 1 and a matrix resin.

8. The resin composition according to claim 7, wherein the matrix resin is a polyolefin.

9. The resin composition according to claim 8, wherein the polyolefin is polypropylene.

10. The resin composition according to claim 7, wherein the matrix resin is a thermoplastic polyester resin.

11. The resin composition according to claim 10, wherein the thermoplastic polyester resin is polybutylene terephthalate.

12. The glass flakes according to claim 1, wherein the binder comprises 20 mass % or more of the silane coupling agent.

* * * * *

UNITED STATES PATENT AND TRADEMARK OFFICE
CERTIFICATE OF CORRECTION

PATENT NO. : 10,611,898 B2
APPLICATION NO. : 15/736649
DATED : April 7, 2020
INVENTOR(S) : Kato et al.

Page 1 of 1

It is certified that error appears in the above-identified patent and that said Letters Patent is hereby corrected as shown below:

On the Title Page

Item (56), Column 2, under "Foreign Patent Documents", Line 2, delete "EP 2816019 A1 12/2014".

Signed and Sealed this
First Day of September, 2020

Andrei Iancu
*Director of the United States Patent and Trademark Office*